United States Patent
Bajic (10) Patent No.: US 11,890,977 B2
(45) Date of Patent: Feb. 6, 2024

(54) PLENUM INSERT FOR SEAT AND METHOD OF ITS FABRICATION

(71) Applicant: IGB Automotive Ltd., Windsor (CA)

(72) Inventor: Goran Bajic, Belle River (CA)

(73) Assignee: IGB Automotive Ltd.

( * ) Notice: Subject to any disclaimer, the term of this patent is extended or adjusted under 35 U.S.C. 154(b) by 0 days.

(21) Appl. No.: 17/694,744

(22) Filed: Mar. 15, 2022

(65) Prior Publication Data

US 2023/0242020 A1    Aug. 3, 2023

Related U.S. Application Data

(60) Provisional application No. 63/306,227, filed on Feb. 3, 2022.

(51) Int. Cl.
| | |
|---|---|
| *B60N 2/00* | (2006.01) |
| *B32B 3/04* | (2006.01) |
| *B32B 7/12* | (2006.01) |
| *B32B 27/12* | (2006.01) |
| *B32B 27/40* | (2006.01) |
| *B32B 38/04* | (2006.01) |
| *B60N 2/56* | (2006.01) |
| *B32B 27/30* | (2006.01) |

(Continued)

(52) U.S. Cl.
CPC ............ B60N 2/5642 (2013.01); B32B 3/04 (2013.01); B32B 7/12 (2013.01); B32B 27/12 (2013.01); B32B 27/304 (2013.01); B32B 27/40 (2013.01); B32B 37/142 (2013.01); B32B 38/0004 (2013.01); B32B 2307/724 (2013.01); B32B 2307/7242 (2013.01); B32B 2605/00 (2013.01)

(58) Field of Classification Search
CPC ........... B60N 2/5642; B32B 3/04; B32B 7/12; B32B 27/12; B32B 27/304; B32B 27/40; B32B 37/142; B32B 38/0004; B32B 2307/724; B32B 2307/7242; B32B 2605/00
USPC .............................................. 156/211 PE, 2 E
See application file for complete search history.

(56) References Cited

U.S. PATENT DOCUMENTS

| | | | | |
|---|---|---|---|---|
| 1,135,786 A | * | 4/1915 | Funk ..................... | B31B 70/826 493/224 |
| 3,647,260 A | * | 3/1972 | Grant ..................... | B32B 27/12 297/283.1 |

(Continued)

FOREIGN PATENT DOCUMENTS

| | | | | |
|---|---|---|---|---|
| EP | 2423040 A2 | * | 2/2012 | ........... B60N 2/5635 |
| GB | 1159997 | * | 7/1969 | ............. C06M 17/02 |
| KR | 20170131984 | * | 12/2017 | ........... B32B 38/004 |

OTHER PUBLICATIONS

Let's Build a Dollhouse Sofa, 6 pages, 2008. (Year: 2008).*

(Continued)

*Primary Examiner* — Linda L Gray
(74) *Attorney, Agent, or Firm* — Carlson, Gaskey & Olds, P.C.

(57) ABSTRACT

A method of fabricating a plenum insert for a vehicle seat includes the steps of providing an outer material layer having an edge, providing an inner spacer layer, placing the inner spacer layer material on the outer material layer, folding the outer material layer over the inner spacer layer such that the edge overlaps itself, and sealing the overlapping edge of the outer material layer to contain the spacer layer.

21 Claims, 11 Drawing Sheets

(51) Int. Cl.
*B32B 37/14* (2006.01)
*B32B 38/00* (2006.01)

(56) References Cited

U.S. PATENT DOCUMENTS

| | | | | |
|---|---|---|---|---|
| 5,569,507 A | * | 10/1996 | Goodwin | A41D 27/245 |
| | | | | 428/68 |
| 2002/0051861 A1 | * | 5/2002 | Jennings | B65D 33/34 |
| | | | | 428/199 |
| 2004/0245811 A1 | * | 12/2004 | Bevan | B60N 2/66 |
| | | | | 297/180.12 |

OTHER PUBLICATIONS

English machine translation of KR20170131984, Dec. 2017, Kim, 15 pages. (Year: 2017).*
Ultimate Guide to Using Upholstery Glue, Sep. 2020, 11 pages. (Year: 2020).*
English machine translation of WO-8200578-A1; Knoche; Mar. 4, 1982; 20 pages. (Year: 1982).*
English machine translation of JP-H0723835-A; Koga; Jan. 27, 1995; 6 pages. (Year: 1995).*
English machine translation of abstract of DE-2355283-A; May 15, 1975; 16 pages. (Year: 1975).*

* cited by examiner

PLENUM INSERT FOR SEAT AND METHOD OF ITS FABRICATION

TECHNICAL FIELD

This invention relates to the field of comfort systems for occupant supports, and more particularly to plenum inserts for vehicular and non-vehicular comfort systems, and a method for fabricating the plenum insert.

BACKGROUND OF THE INVENTION

It is known in the art relating to seating comfort systems for a plenum insert to include at least three layers and to be fabricated using at least three die-cut operations. The top layer of the plenum insert is die-cut, the middle spacer layer is die-cut, and the bottom layer is die-cut, followed by these three layers being stacked and sealed around all of the edges by RF, hot lamination, or the like.

SUMMARY OF THE INVENTION

The present invention provides a method of fabricating a plenum insert for a seat, which is simpler and includes fewer steps than known, conventional fabrication methods for plenum inserts. The method includes using two layers (an outer layer of material and an inner spacer material), followed by the outer layer being folded over the inner spacer material and sealed along only the open, overlapping edges as one edge of the outer layer is folded over and thus an integral portion of the plenum. The method may include two cutting operations in which the inner spacer layer is cut, followed by folding the outer layer over the cut spacer layer, sealing the open, overlapping edges of the outer layer, and finally cutting the outer layer. Alternatively, the method may include only one cutting operation in which the outer layer is folded over the inner spacer layer, followed by sealing overlapping portions of the outer layer, and a single cutting of all the layers of the folded-over assembly along the sealed portions. In yet another alternative, the method may include cutting of the outer layer into a desired shape, cutting the spacer layer into a desired shape folding the outer layer over the spacer layer, followed by sealing overlapping portions of the outer layer, without any final cut after sealing.

These and other features and advantages of the invention will be more fully understood from the accompanying drawings.

DETAILED DESCRIPTION OF THE INVENTION

Figure 1:
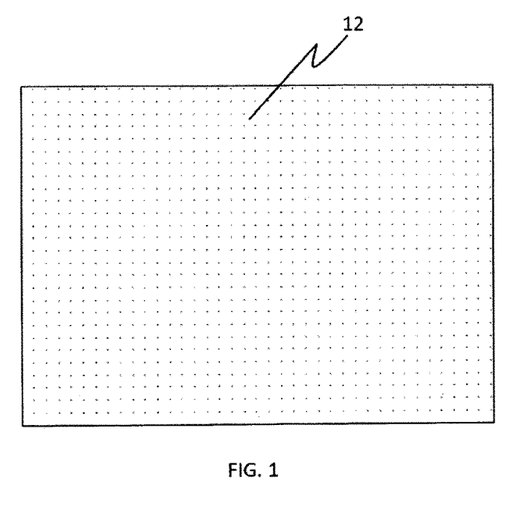
FIG. 1 is a plan view of a first step of a method of fabricating a plenum insert in accordance with an embodiment of the invention, in which an outer layer of the plenum insert is provided.
Figure 11:
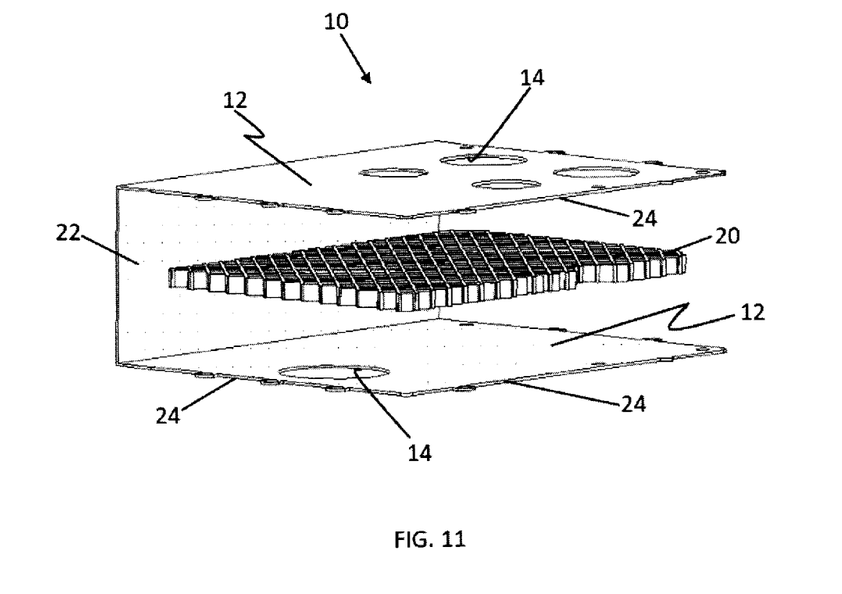
FIG. 11 is an exploded perspective view of an embodiment of the plenum illustrating the outer layer including a combination of PU and felt layers and an adhesive.

Referring now to the drawings in detail, numeral 10 generally indicates plenum insert for a vehicle seat. More particularly, as shown in FIG. 1, in a method of fabricating a plenum insert, a first step is to provide a single, outer, air non-breathable carrier layer 12 that is a film material such as a polyurethane (PU) film, a polyvinyl chloride (PVC) film, or other similar generally non-permeable material. Alternatively, as illustrated in FIG. 11, the single outer layer may be formed by joining multiple layers of material such as a combination of felt and PU film adhesive, and optionally other additional layers such as pressure sensitive adhesive (PSA) tape. The outer layer may be provided in a roll or in sheets.

Figure 2:
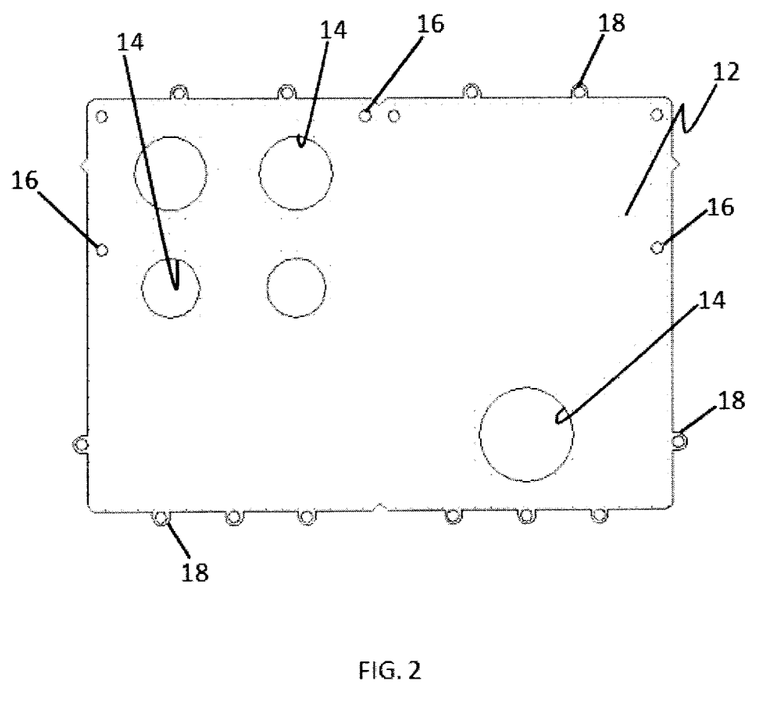
FIG. 2 is a plan view of a second step of the method of fabricating the plenum insert, in which features of the outer layer are cut as shown.

As shown in FIG. 2, a second step is to cut the outer layer by die-cutting, laser cutting, or other suitable cutting method to form the final shape of the outer layer with needed apertures 14 for air passage, fixtures for production such as fix points 16, ears 18, and the like.

Figure 3:
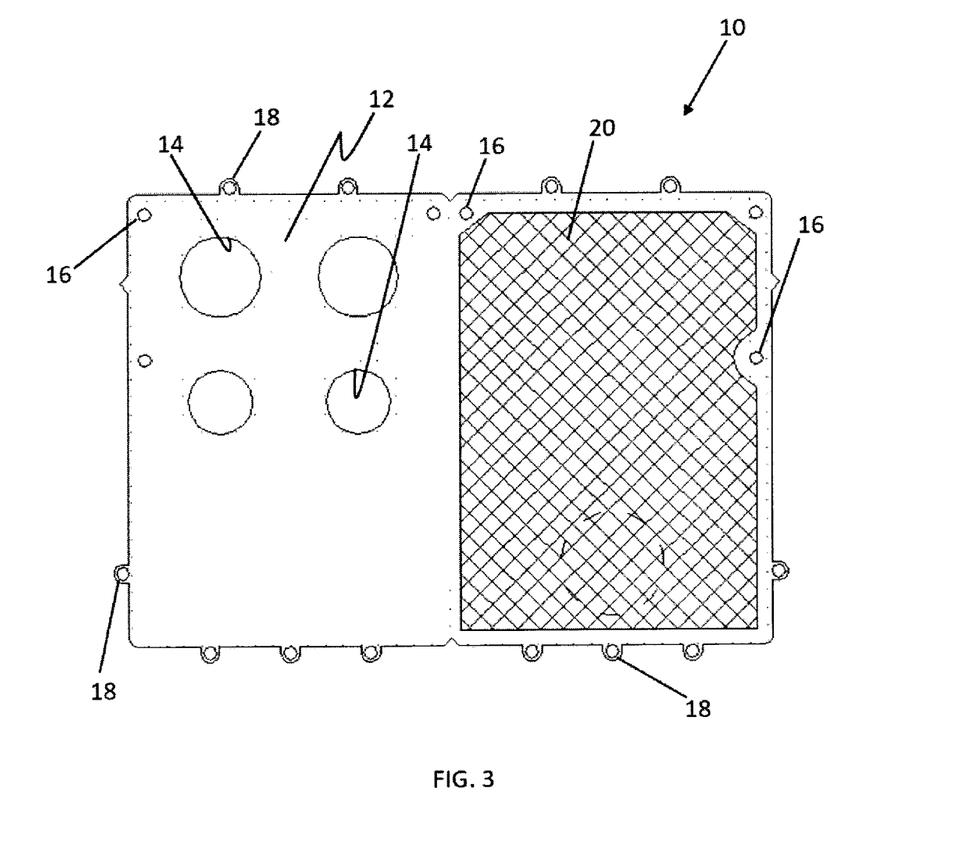
FIG. 3 is a plan view of a third step of the method of fabricating the plenum insert, in which an inner spacer material is positioned on a surface of the outer layer.

Turning to FIG. 3, a third step is to position a spacer layer 20 on the outer layer 12. The spacer layer 20 may be pre-cut by die-cutting, laser cutting, or the like. Alternatively, the spacer layer 20 may be cut at a later step with the outer layer 12. The spacer layer 20 also optionally may be adhered to the outer layer 12 with an RF tool, a hot laminator, or similar. The spacer layer 20 may be formed of an air-permeable fabric or other air-permeable material, or may be any other generally planar air-permeable structure.

Figure 4:
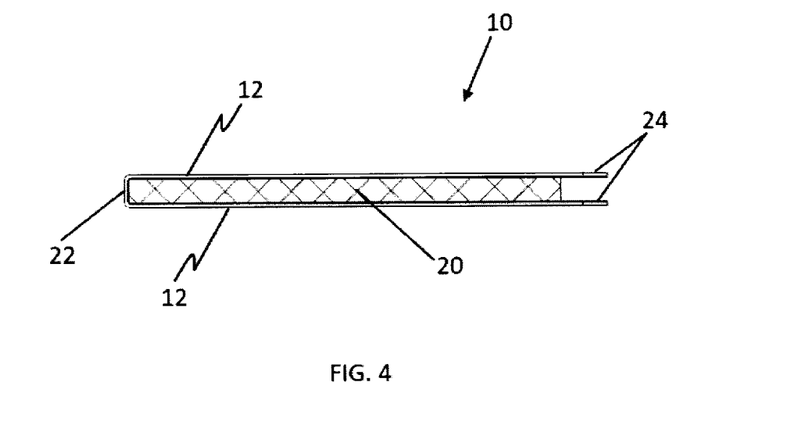
FIG. 4 is a side view of a fourth step of fabricating the plenum insert, in which the outer layer is folded in half to envelope the inner spacer material.
Figure 5:
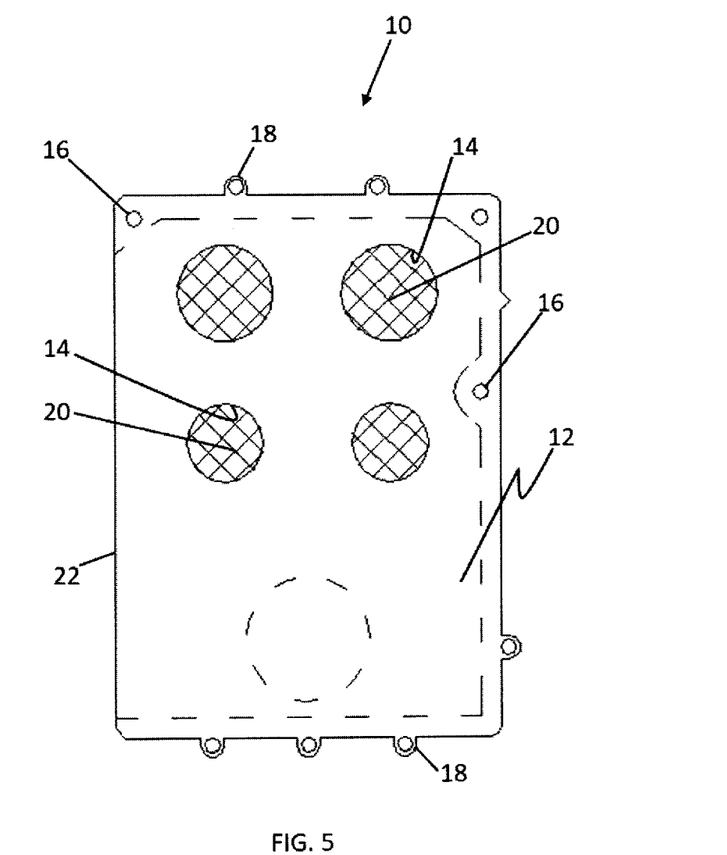
FIG. 5 is a plan view of the folded outer layer enveloping the inner spacer material.

As shown in FIGS. 4 and 5, a fourth step is to fold the outer layer 12 over the spacer layer 20, such as by folding the outer layer in half along a folded over edge 22. Alternatively, the outer layer 12 may not be folded in half along a center line, but instead folded along a line that is offset from the center, thus the folded over portion may be larger or smaller than half of the outer layer. For example, the folded over portion may be ⅓ of the total size of the outer layer, ¾ of the total size, or similar. In any case the general surface area of the outer layer 12 is at least twice as large as the general surface area of the spacer layer 20.

Figure 6:
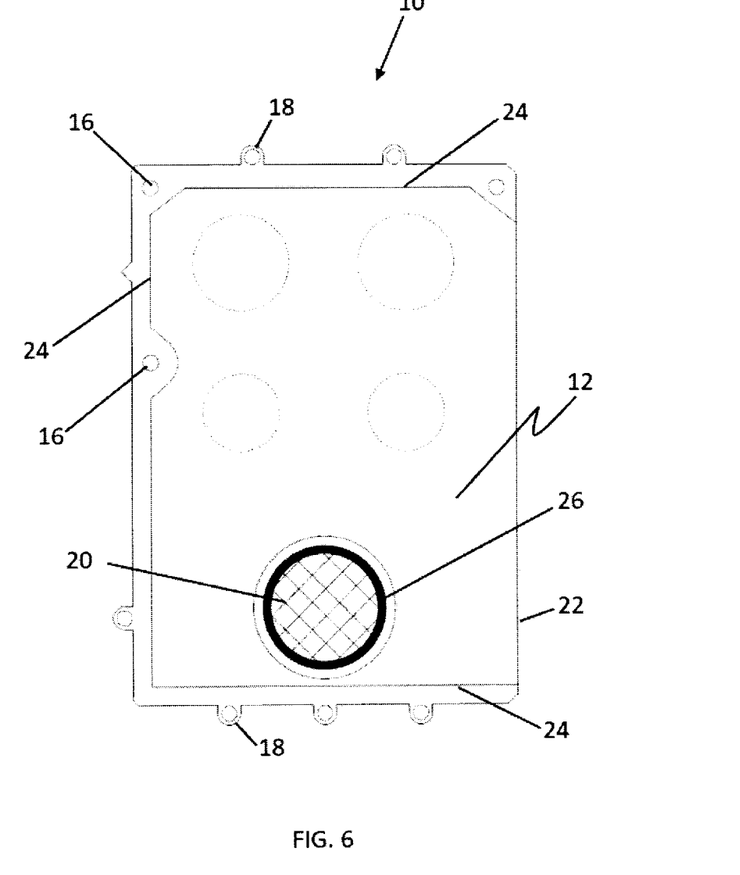
FIG. 6 illustrates in plan view a fifth step of the method of fabricating the plenum insert, in which the plenum insert is sealed along the open edges of the overlapping, folded-over outer layer in order to enclose the spacer material within the plenum insert and an attached component for an air mover is shown attached to the outer surface of the outer layer.
Figure 7:
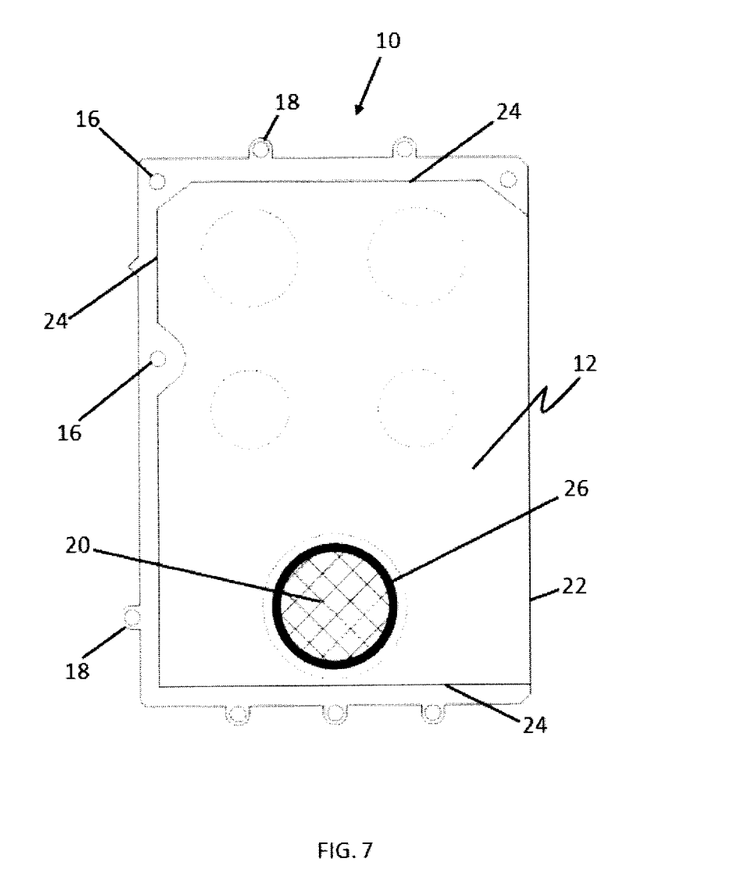
FIG. 7 illustrates in plan view the fifth step of the method of fabricating the plenum insert, in which the plenum insert is sealed along the open edges of the overlapping, folded-over outer layer in order to enclose the spacer material within the plenum insert and an attached component for an air mover is shown attached to the inner surface of the outer layer.
Figure 8:
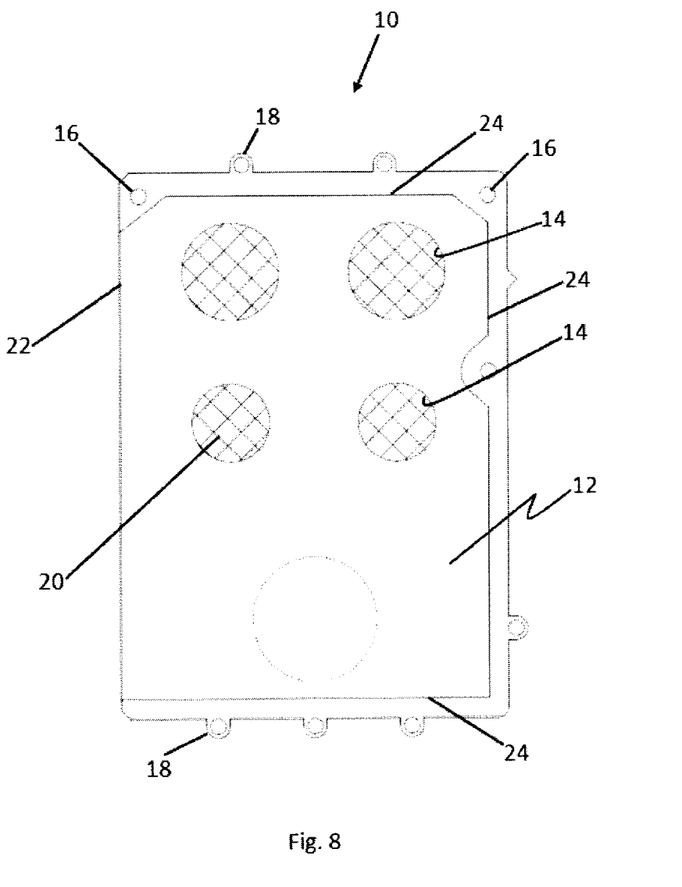
FIG. 8 illustrates in plan view the opposite side appearance of the plenum insert of FIGS. 6 and 7.

Turning to FIGS. 6, 7 and 8, a fifth step is to seal (such as by RF, hot lamination, or the like) the open overlapping portions 24 of the folded outer layer 12 while not sealing along the folded-over edge 22 of the outer layer (because this edge is already integrally sealed), in order to seal the spacer layer 20 within the folded outer layer.

Although the plenum insert 10 is shown by example to have four sides in which three sides are sealed (and the fourth side is the folded over side), the plenum insert may alternatively have a polygonal shape with more than four sides. In this case, the outer layer 12 may be sealed along more than three open edges, and the folded over edges may constitute more than one edge of the insert. For example, the plenum insert 10 may be sealed along fourteen edges, and the insert may have two edges that are the folded-over edges.

With continued reference to FIGS. 6 and 7, an attachment component 26 for an air mover (not shown) may be attached to the outside, FIG. 6, or inside, FIG. 7, of the outer surface 12.

An optional sixth step is to cut the final outline of the plenum insert 10 by cutting (such as by laser cutting, die-cutting, or similar) along sealed edges of the outer layer 12. For example, the outer layer 12 may be cut to remove extraneous material, without cutting the inner spacer material 20 which is cut before sealing within the outer layer. Alternatively, the inner spacer layer 20 may not be pre-cut, and the inner spacer layer may then be cut together with the outer layer 12 to remove extraneous material in one single cutting operation.

This single cutting may also be the final step in the fabrication of the plenum insert 10. However, in the alternative, the outer layer 12 and inner spacer layer 20 may be pre-cut into their respective shapes prior to folding the outer layer over the spacer layer, thus eliminating the step of final cutting after sealing the open edges of the plenum insert.

Figure 9:
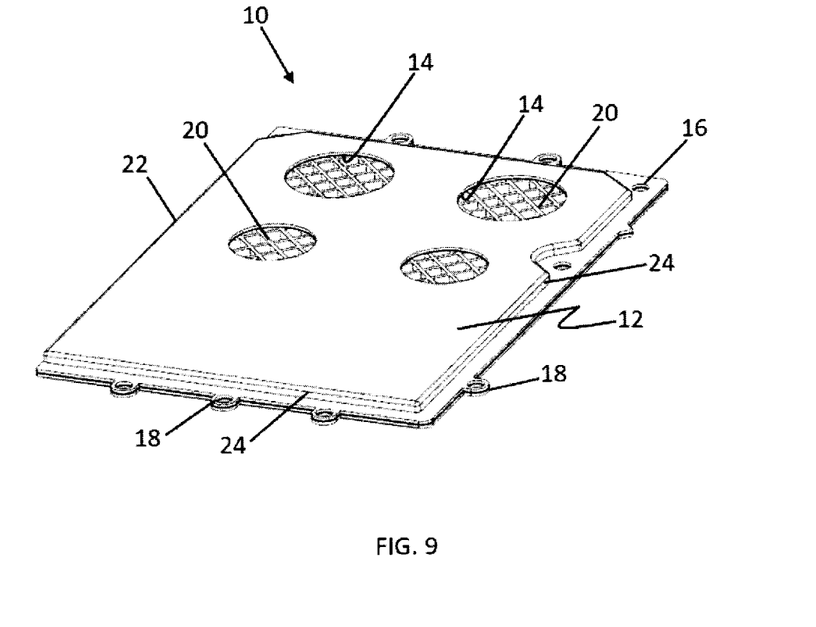
FIG. 9 illustrates in perspective view one side of the fabricated plenum insert.
Figure 10:
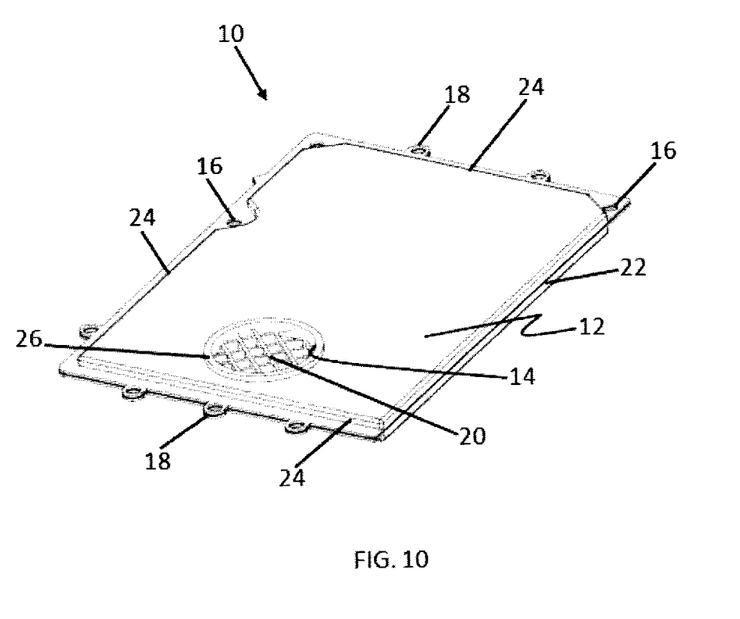
FIG. 10 illustrates in perspective view the other side of the fabricated plenum insert of FIG. 9.

FIGS. 9 and 10 illustrate a finished fabrication of the plenum insert 10 for mounting in a vehicle seat.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It should also be understood that the invention disclosed and defined herein extends to all alternative combinations of two or more of the individual features mentioned or evident from the text and/or the drawings. All of these different combinations constitute various alternative aspects of the present invention. The embodiments described herein explain the best modes known for practicing the invention and will enable others skilled in the art to utilize the invention.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of fabricating a seating comfort system plenum insert for insertion into a vehicle seat, the method comprising:
   providing an outer material layer of a non-permeable single or multi-layer film having an edge;
   providing an air-permeable inner spacer layer;
   placing the air-permeable inner spacer layer on the outer material layer;
   folding the outer material layer over the air-permeable inner spacer layer such that the edge of the outer material layer overlaps itself and comprises an overlapping edge; and
   sealing the overlapping edge of the outer material layer around to air-permeable inner spacer layer and forming a folded over sealed insert having a sealed edge that is sealed about an entirety of a periphery of the folded over sealed insert.

2. The method of claim 1 wherein the outer material layer consists of said non-permeable single or multi-layer film and felt.

3. The method of claim 1 wherein the outer material layer comprises a polyurethane film.

4. The method of claim 1 wherein the outer material layer comprises a polyvinyl chloride film.

5. The method of claim 1 wherein the air-permeable inner spacer layer comprises a permeable woven fabric.

6. The method of claim 1 wherein the outer material layer is formed by joining multiple layers of material.

7. The method of claim 6 wherein the multiple layers include felt and a polyurethane film adhesive.

8. The method of claim 7 wherein the joined multiple layers further include a pressure sensitive adhesive tape.

9. The method of claim 1 further including:
   cutting the air-permeable inner spacer layer to a vehicle seat configuration prior to folding the outer material layer over the air-permeable inner spacer layer and sealing the overlapping edge of the outer material layer around the air-permeable inner spacer layer; and
   cutting the outer material layer.

10. The method of claim 1 further including cutting the folded over sealed insert along the sealed edge.

11. The method of claim 1 including: cutting the outer material layer into a shape;
   cutting the air-permeable inner spacer layer into a shape fittable within the folded over outer material layer;
   subsequently folding the outer material layer over the air-permeable inner spacer layer; and
   sealing said overlapping edge of the outer material layer without any final cut after sealing.

12. The method of claim 1 wherein folding of the outer material layer over the air-permeable inner spacer layer is accomplished by folding the outer material layer in half.

13. The method of claim 1 wherein folding of the outer material layer over the air-permeable inner spacer layer is accomplished by folding the outer material layer along a line offset from a line generally center of the outer material layer.

14. The method of claim 1 wherein the outer material layer has a surface area is at least twice a surface area of the air-permeable inner spacer layer.

15. The method of claim 1 wherein sealing of the overlapping edge of the outer material layer to contain the air-permeable inner spacer layer is performed by radio frequency heating, hot lamination, or adhesive tape.

16. The method of claim 1 including attaching an air mover attachment component to an outside surface of the outer material layer.

17. The method of claim 1 including attaching an air mover attachment component to an inside surface of the outer material layer.

18. The method of claim 1 including adhering the air-permeable inner spacer layer to the outer material layer prior to folding.

19. The method of claim 1 including:
   forming one or more fixing points in the sealed edge, or forming one or more ears to extend outward of the sealed edge.

20. The method of claim 1 including:
cutting the air-permeable inner spacer layer to a shape prior to folding, or
cutting the air-permeable inner spacer layer with the outer material layer.

21. The method of claim 1 wherein outer peripheral edges of the air-permeable inner spacer layer are completely covered by the outer material layer.

* * * * *